United States Patent
Hsu et al.

(10) Patent No.: US 9,141,566 B2
(45) Date of Patent: Sep. 22, 2015

(54) METHOD OF ACCESSING ON-CHIP READ ONLY MEMORY AND COMPUTER SYSTEM THEREOF

(71) Applicant: Skymedi Corporation, Hsinchu (TW)

(72) Inventors: Chia-Jung Hsu, Hsinchu (TW); Chih-Cheng Tu, Hsinchu (TW); Yun-Chin Lin, Hsinchu (TW)

(73) Assignee: Skymedi Corporation, Hsinchu Science Park, Hsinchu (TW)

( * ) Notice: Subject to any disclaimer, the term of this patent is extended or adjusted under 35 U.S.C. 154(b) by 304 days.

(21) Appl. No.: 13/897,439

(22) Filed: May 19, 2013

(65) Prior Publication Data

US 2014/0344502 A1    Nov. 20, 2014

(51) Int. Cl.
*G06F 12/06*    (2006.01)
*G06F 13/16*    (2006.01)

(52) U.S. Cl.
CPC .............. *G06F 13/16* (2013.01); *G06F 13/161* (2013.01); *G06F 13/1668* (2013.01)

(58) Field of Classification Search
CPC ....................................... G06F 13/16
USPC .......................................................... 711/102
See application file for complete search history.

(56) References Cited

U.S. PATENT DOCUMENTS

2008/0294855 A1    11/2008    Chen
2009/0228633 A1    9/2009    Horishima

*Primary Examiner* — Cheng-Yuan Tseng
*Assistant Examiner* — Zubair Ahmed
(74) *Attorney, Agent, or Firm* — Winston Hsu; Scott Margo

(57) ABSTRACT

A method of accessing an on-chip read only memory (ROM) includes dividing a frequency of a system clock by a specific divisor, in order to generate a ROM clock; combining a specific number of adjacent addresses into a combined address, wherein the specific number is determined according to the specific divisor; inserting a first stall signal into a real output data, wherein a length of the first stall signal is determined in order to meet a timing requirement for accessing the on-chip ROM; generating an output data of the on-chip ROM according to the combined address, wherein a width of the output data is extended by a specific multiple which is determined according to the specific number; and generating a first delay corresponding to the length of the first stall signal in the address.

22 Claims, 14 Drawing Sheets

METHOD OF ACCESSING ON-CHIP READ ONLY MEMORY AND COMPUTER SYSTEM THEREOF

BACKGROUND OF THE INVENTION

1. Field of the Invention

The present invention relates to a method of accessing an on-chip read only memory (ROM) and a computer system thereof, and more particularly, to a method of accessing an on-chip ROM and a computer system thereof, capable of increasing the operation speed of the computer system by combining addresses of the ROM and extending an output data width of the ROM.

2. Description of the Prior Art

In a computer system, memories can generally be classified into two types: external and on-chip. The external memories have larger storage space and need longer access time (e.g. usually hundreds of system clock cycles). The on-chip memories are high speed internal memories used for temporary storage of calculations, data, or other works in progress, where memory data are accessed in shorter time (e.g. usually within one system clock cycle). The on-chip memories are provided for the processor (e.g. central processing unit (CPU)) to perform fast retrieval, and can be further classified into random access memory (RAM) and read only memory (ROM). The on-chip RAM is usually used for storing temporary data or instruction codes, and the on-chip ROM stores data for system initializing or boot procedure. For some applications, a computer system may have only the ROM without any RAM.

With process advances, the frequency of the system clock becomes faster; hence timing requirements for accessing these on-chip memories become more critical to the computer system. Access speeds of the on-chip RAM and the on-chip ROM are different in nature. In general, in comparison with the on-chip RAM, the on-chip ROM has a lower access speed and a larger access time delay may be generated in the access path for the on-chip ROM, such that this access path may become a critical path in some systems or for some application. As a result, the clock frequency and operation speed of the computer system will be limited due to the access of the on-chip ROM. Thus, there is a need for improvement over the prior art.

SUMMARY OF THE INVENTION

It is therefore an objective of the present invention to provide a method of accessing an on-chip read only memory (ROM) and a computer system thereof, which is capable of increasing the operation speed of the computer system by combining addresses of the ROM and extending an output data width of the ROM.

The present invention discloses a method of accessing an on-chip read only memory (ROM). The method comprises dividing a frequency of a system clock by a specific divisor, in order to generate a ROM clock; combining a specific number of adjacent addresses into a combined address, wherein the specific number is determined according to the specific divisor; inserting a first stall signal into a real output data, wherein a length of the first stall signal is determined in order to meet a timing requirement for accessing the on-chip ROM; generating an output data of the on-chip ROM according to the combined address, wherein a width of the output data is extended by a specific multiple which is determined according to the specific number; and generating a first delay corresponding to the length of the first stall signal in the address.

The present invention further discloses a computer system for accessing an on-chip read only memory (ROM). The computer system comprises a processor; a logic circuit, controlled by the processor, for generating control signals for the on-chip ROM and receiving a real output data from the on-chip ROM; and a ROM controller for converting the control signals to control the on-chip ROM by executing the following steps: dividing a frequency of a system clock by a specific divisor in order to generate a ROM clock, combining a specific number of adjacent addresses into a combined address wherein the specific number is determined according to the specific divisor, and inserting a first stall signal into the real output data wherein a length of the stall signal is determined in order to meet a timing requirement for accessing the on-chip ROM; wherein the on-chip ROM generates an output data according to the combined address, wherein a width of the output data is extended by a specific multiple which is determined according to the specific number; and wherein the processor generates a first delay corresponding to the length of the first stall signal in the address.

The present invention further discloses a method of accessing an on-chip read only memory (ROM). The method comprises combining a specific number of adjacent addresses into a combined address; generating an output data of the on-chip ROM according to the combined address, wherein a width of the output data is extended by a specific multiple which is determined according to the specific number; inserting a first extended cycle before each of the output data of the on-chip ROM; inserting a first stall signal into a real output data, wherein a length of the first stall signal is determined corresponding to the first extended cycle, in order to meet a timing requirement for accessing the on-chip ROM; and generating a first delay corresponding to the length of the first stall signal in the address.

The present invention further discloses a computer system for accessing an on-chip read only memory (ROM). The computer system comprises a processor; a logic circuit, controlled by the processor, for generating control signals for the on-chip ROM and receiving a real output data from the on-chip ROM; and a ROM controller for converting the control signals to control the on-chip ROM by executing the following steps: combining a specific number of adjacent addresses into a combined address; and inserting a first stall signal into the real output data, wherein a length of the stall signal is determined corresponding to a first extended cycle, in order to meet a timing requirement for accessing the on-chip ROM; wherein the on-chip ROM generates an output data according to the combined address wherein a width of the output data is extended by a specific multiple which is determined according to the specific number, and inserts the first extended cycle before each of the output data of the on-chip ROM; and wherein the processor generates a first delay corresponding to the length of the first stall in the address.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
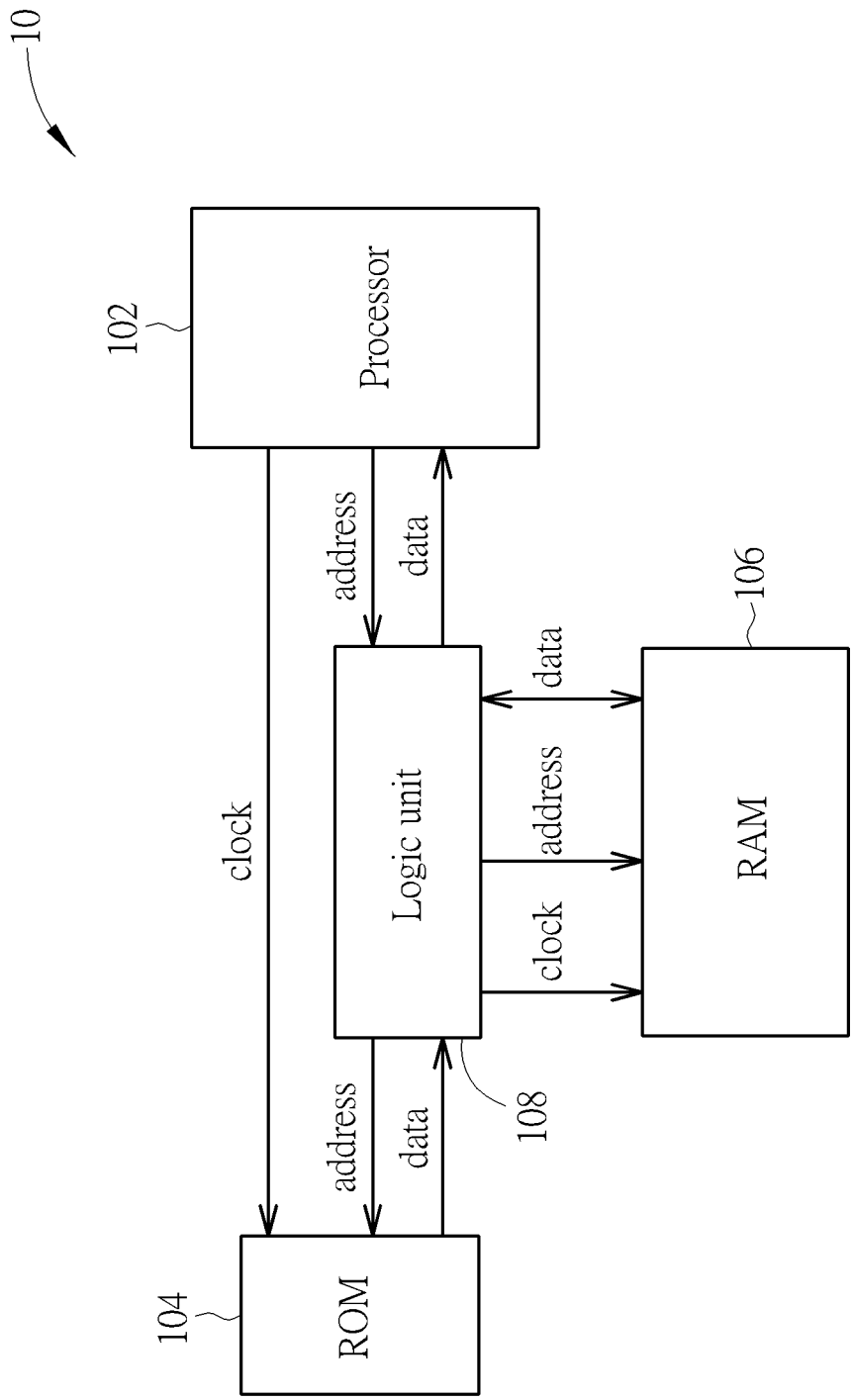
FIG. 1 is a schematic diagram of a general computer system with on-chip memories such as random access memory (RAM) and read only memory (ROM).
Figure 2:
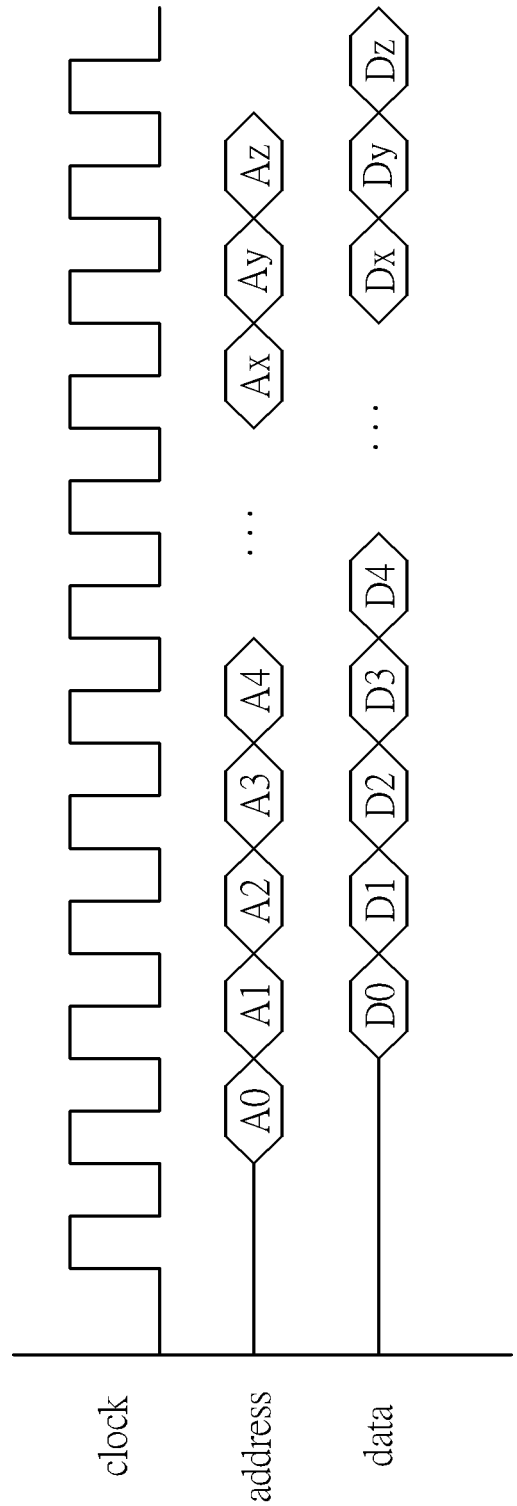
FIG. 2 is a waveform diagram of the signals for accessing the on-chip memories shown in FIG. 1.

Please refer to FIG. 1, which is a schematic diagram of a general computer system 10 with on-chip memories such as random access memory (RAM) and read only memory (ROM). As shown in FIG. 1, the computer system 10 includes a processor 102, an on-chip ROM 104, an on-chip RAM 106 and a logic unit 108. The processor 102 accesses the ROM 104 or the RAM 106 via the logic unit 108. In detail, the processor 102 sends a system clock and an address to the ROM 104 or the RAM 106, and accesses data corresponding to the address for the ROM 104 or the RAM 106. The processor 102 can read data from or write data to the RAM 106, but can only read data from the ROM 104 (since it is read-only). The waveforms of these signals are illustrated in FIG. 2. As shown in FIG. 2, for the ROM 104, the processor 102 sends an address A0 to the ROM 104 and receives a data D0 from the ROM 104 in the next clock cycle, sends an address A1 to the ROM 104 and receives a data D1 from the ROM 104 in the next clock cycle, and so on. In general, the processor 102 accesses the ROM 104 for initializing the system, and then switches to access the RAM 106 for other operations.

Figure 3:
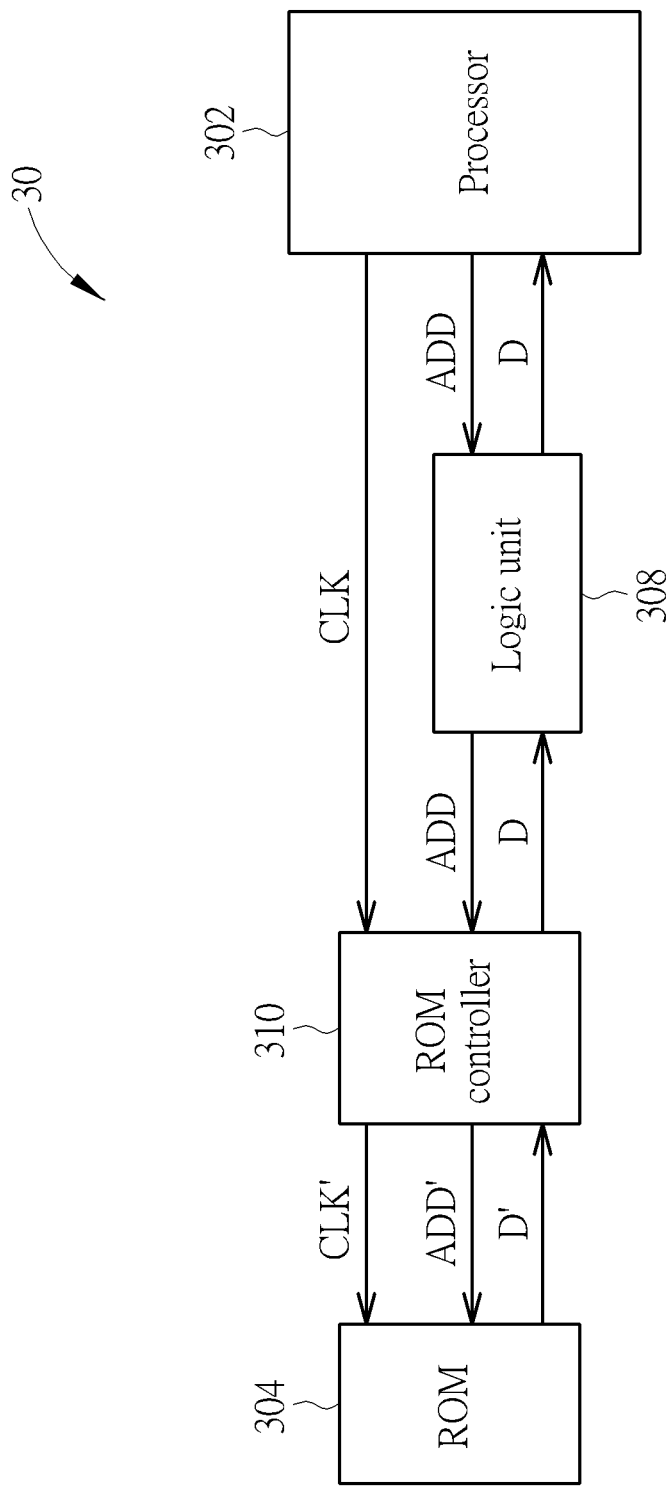
FIG. 3 is a schematic diagram of a computer system according to an embodiment of the present invention.

Please refer to FIG. 3, which is a schematic diagram of a computer system 30 according to an embodiment of the present invention. As shown in FIG. 3, the computer system 30 includes a processor 302, an on-chip ROM 304, a logic unit 308 and a ROM controller 310. Functions of the processor 302, the ROM 304 and the logic unit 308 are similar to those of the processor 102, the ROM 104 and the logic unit 108, and will not be detailed herein. The main difference between the computer system 30 and the computer system 10 is that the computer system 30 includes a ROM controller 310, which is utilized for combining addresses ADD of the ROM 304 into a combined address ADD', and a width of an output data D' of the ROM 304 is extended accordingly. In addition, the on-chip RAM is omitted in FIG. 3 for simplicity.

Figure 4:
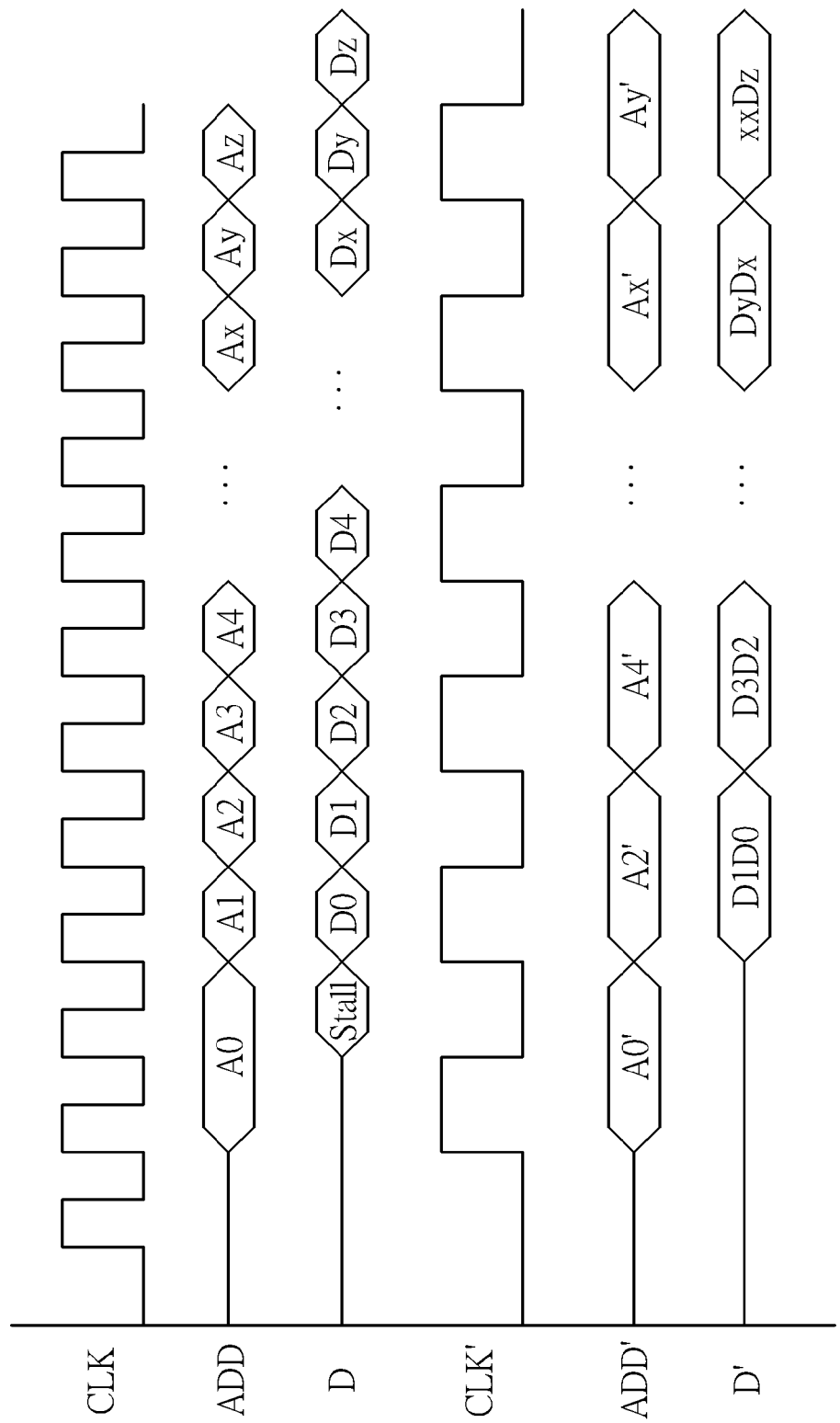
FIG. 4 is a waveform diagram of the signals for accessing the ROM shown in FIG. 3.

In detail, the ROM 304 receives the ROM clock CLK' and the combined address ADD', instead of the system clock CLK and the address ADD as the ROM 104 receives in FIG. 1. On the other hand, the output data D' is read from the ROM 304, instead of the real output data D as being read from the ROM 104 in FIG. 1. One embodiment of these signals is illustrated in FIG. 4, which is a waveform diagram of the signals for accessing the ROM 304. As shown in FIG. 3 and FIG. 4, the ROM controller 310 divides the frequency of the system clock CLK by 2 and generates the ROM clock CLK'. In other embodiments, the frequency divisor may be any number, which is not limited herein. The ROM controller 310 further combines 2 adjacent addresses ADD into a combined address ADD'. For example, addresses A0 and A1 are combined into a combined address A0', addresses A2 and A3 are combined into a combined address A2', and so on. The number of the adjacent addresses ADD combined should be determined according to the frequency divisor for generating the ROM clock CLK'. In most cases, the number of the adjacent addresses ADD combined is equal to the frequency divisor, in order to meet timing requirements for accessing the ROM 304. Since the combined address ADD' received by the ROM 304 provides more information about the ROM data, the ROM 304 can send the output data D' with a larger width, which is double the width of data read from the ROM 104 shown in FIG. 1. In general, the width of the output data D' is extended by a multiple from the original data where the multiple is determined according to the number of the addresses ADD combined into each of the combined address ADD', which is further determined according to the frequency divisor for generating the ROM clock CLK'.

Please keep referring to FIG. 3 and FIG. 4. The ROM controller 310 fetches the output data D' of the ROM 304 to generate the real output data D. For example, an output data D1D0 is fetched to generate real output data D1 and D0, an output data D3D2 is fetched to generate real output data D3 and D2, and so on. As a result, the real output data D should be equal to the original data read from the ROM 104 shown in FIG. 1. In such a condition, the ROM 304 may not be the critical path in the computer system 30 since the ROM clock CLK' has a lower frequency, and the output data D' with an extended width is generated at the same time and fetched in each of the system clock cycle CLK.

In order to meet the timing requirement for accessing the on-chip ROM (i.e. the output data is generated in the next clock cycle after the corresponding address is received), however, a delay should be generated in the address ADD, as shown in FIG. 4. Therefore, a stall signal is inserted into the real output data D, where the length of the stall signal is determined in order to meet the timing requirement for accessing the on-chip ROM. The stall signal may inform the processor 302 to generate the delay and to stop receiving the real output data D, where the delay time corresponds to the length of the stall signal. As a result, the timing requirement for accessing the ROM 304 can be satisfied.

As mentioned above, the on-chip ROM has a lower access speed than the on-chip RAM, and thus the access path for the on-chip ROM may always be the critical path of the computer system. Therefore, adjacent addresses are combined and the output data is extended, in order to increase the operation speed of the ROM. In most cases, the frequency divisor for generating the ROM clock, the number of addresses combined in each combined address, and the multiple by which the output data is extended are all equal. These parameters are determined according to a difference between the access speed for the on-chip ROM and the access speed for the on-chip RAM. For example, if data of the on-chip RAM can be accessed in 10 ns, the clock received by the RAM can be improved to 100 MHz; on the other hand, if data of the ROM 304 can be accessed in 20 ns, the clock received by the ROM should be limited to 50 MHz. In this embodiment, therefore, the system clock can be divided by 2 to generate the ROM clock CLK' wherein the ROM clock CLK' is limited to 50 MHz, so that the system clock can reach 100 MHz. The operation speed of the computer system can therefore be increased from 50 MHz to 100 MHz according to the above embodiment. In such a condition, the frequency divisor for generating the ROM clock CLK', the number of addresses ADD in each combined address ADD', and the multiple by which the output data D' is extended are all equal to 2. In other cases where the difference between the access speed for the on-chip ROM and the access speed for the on-chip RAM is larger, e.g. the access time for the on-chip ROM is fivefold or tenfold greater than that for the on-chip RAM, these parameters may be larger in order to meet the access time requirements of these memories and the operation speed requirements of the computer system.

Please keep referring to FIG. 4. As mentioned above, the adjacent addresses ADD are combined to generate the combined address ADD', but the combined address ADD' is ahead of the address ADD by one system clock cycle. For example, the combined address A2' is generated by combining the addresses A2 and A3, but the timing of the combined address A2' is synchronized to the timing of the addresses A1 and A2. In other words, the ROM controller 310 can predict the follow-up information of the address ADD and perform the combination in the combined address ADD' in advance. As a result, the real output data D, which is generated according to the combined address ADD', can be fetched in time.

Figure 5:
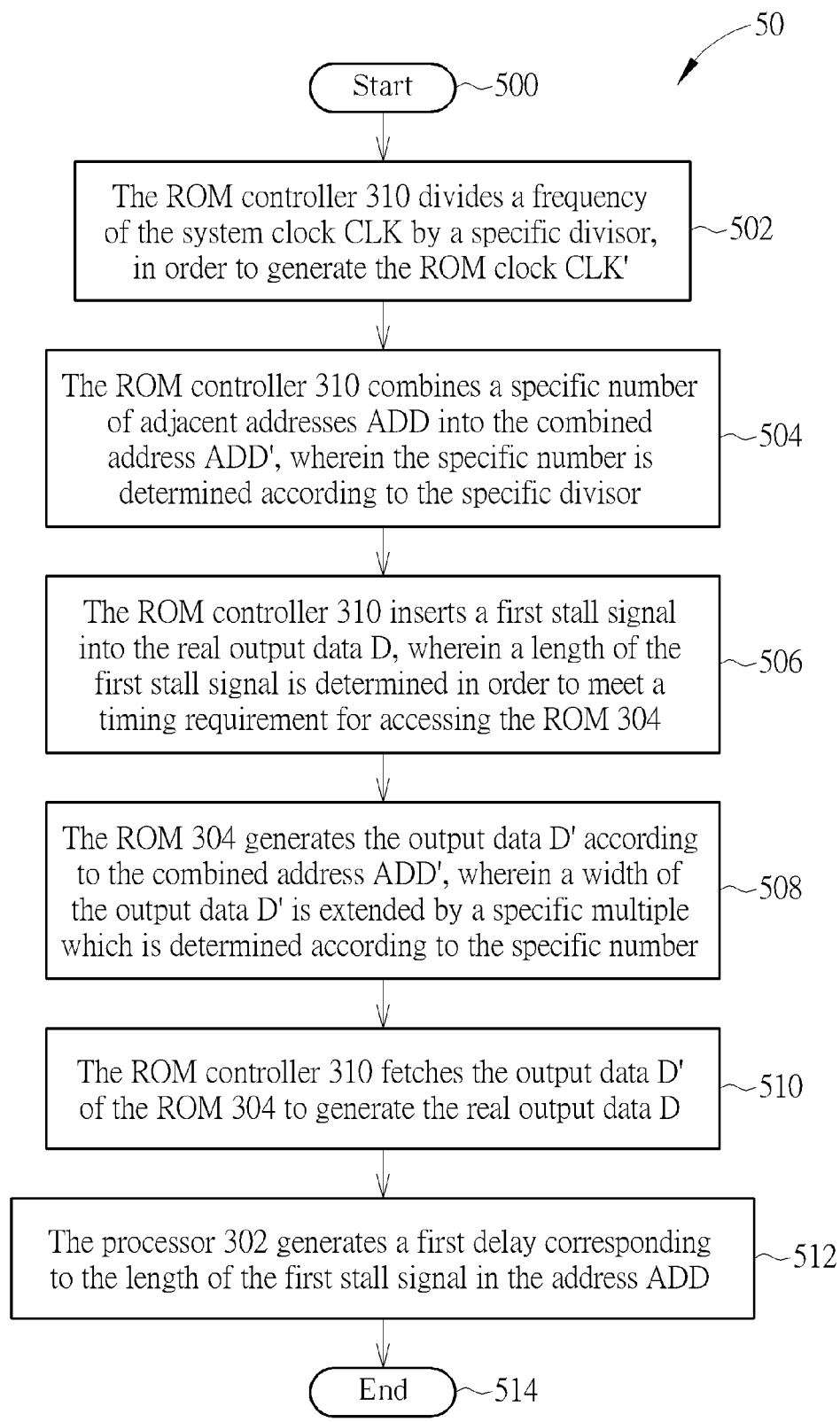
FIG. 5 is a schematic diagram of the on-chip ROM accessing process according to an embodiment of the present invention.

The above operations of accessing the ROM 304 for the computer system 30 can be summarized into an on-chip ROM accessing process 50, as shown in FIG. 5. The on-chip ROM accessing process 50 includes the following steps:

Step 500: Start.

Step 502: The ROM controller 310 divides a frequency of the system clock CLK by a specific divisor, in order to generate the ROM clock CLK'.

Step 504: The ROM controller 310 combines a specific number of adjacent addresses ADD into the combined address ADD', wherein the specific number is determined according to the specific divisor.

Step 506: The ROM controller 310 inserts a first stall signal into the real output data D, wherein a length of the first stall signal is determined in order to meet a timing requirement for accessing the ROM 304.

Step 508: The ROM 304 generates the output data D' according to the combined address ADD', wherein a width of the output data D' is extended by a specific multiple which is determined according to the specific number.

Step 510: The ROM controller 310 fetches the output data D' of the ROM 304 to generate the real output data D.

Step 512: The processor 302 generates a first delay corresponding to the length of the first stall signal in the address ADD.

Step 514: End.

Figure 6:
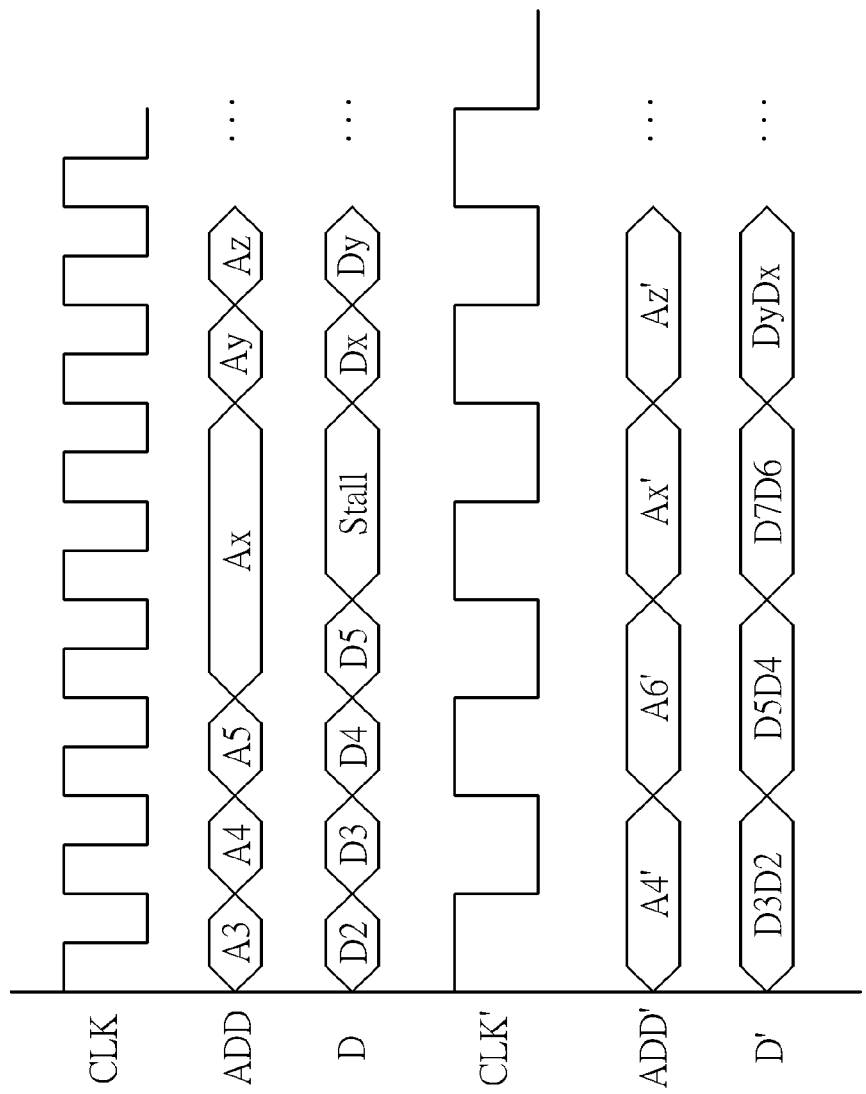
FIG. 6 is a waveform diagram of the signals for accessing the ROM shown in FIG. 3 when a branch occurs.

Sometimes a branch may occur in the address ADD; that is, the processor 302 may not send the address ADD in a predefined order. Please refer to FIG. 6, which is a waveform diagram of the signals for accessing the ROM 304 when a branch occurs. As shown in FIG. 6, the address sends in the following order: A3, A4, A5, Ax, Ay and Az, where the branch occurs between A5 and Ax. Since the ROM controller 310 predicts that the address A5 may be followed by A6, the combined address A6' is sent after A4' in the combined address ADD'. At this moment, however, the branch is detected; hence the prediction for the combined address ADD' should be interrupted. The ROM controller 310 then changes the combined address ADD' to be Ax' instead of A8' to follow A6' according to the branch, where the combined address Ax' is combined with the addresses Ax and Ay. When the branch occurs, a stall signal is inserted into the real output data D since the data D6 is not required by the processor 302. This stall signal may exist until the output data D' corresponding to the changed combined address ADD' is generated; that is, the ROM controller 310 can fetch the desired real output data (i.e. Dx) again. The processor 302 receives the stall signal and generates a delay corresponding to the length of the stall signal in the address ADD. For example, until an output data DyDx is generated, the stall signal is released and the ROM controller 310 fetches the output data DyDx to generate real output data Dx and Dy. The processor 302 learns that the stall signal is released and proceeds to send the follow-up address ADD.

As can be seen, in FIG. 6, the stall signal inserted in the real output data D has a length equal to 2 cycles of the system clock CLK. Since an error is generated in the prediction of the ROM controller 310 when the branch occurs, a stall signal with at least one system clock cycle should be inserted into the real output data D in order to adapt to this error. The correct combined address Ax' is then generated after the combined address A6', which is generated due to the prediction error and has a length equal to 2 system clock cycles. Since the wrong data length in the combined address ADD' is equal to 2 system clock cycles, the length of the stall signal in the real output data D should also be 2 system clock cycles, which allows the ROM 304 to fetch the correct data in accordance with the correct combined address Ax'.

Figure 7:
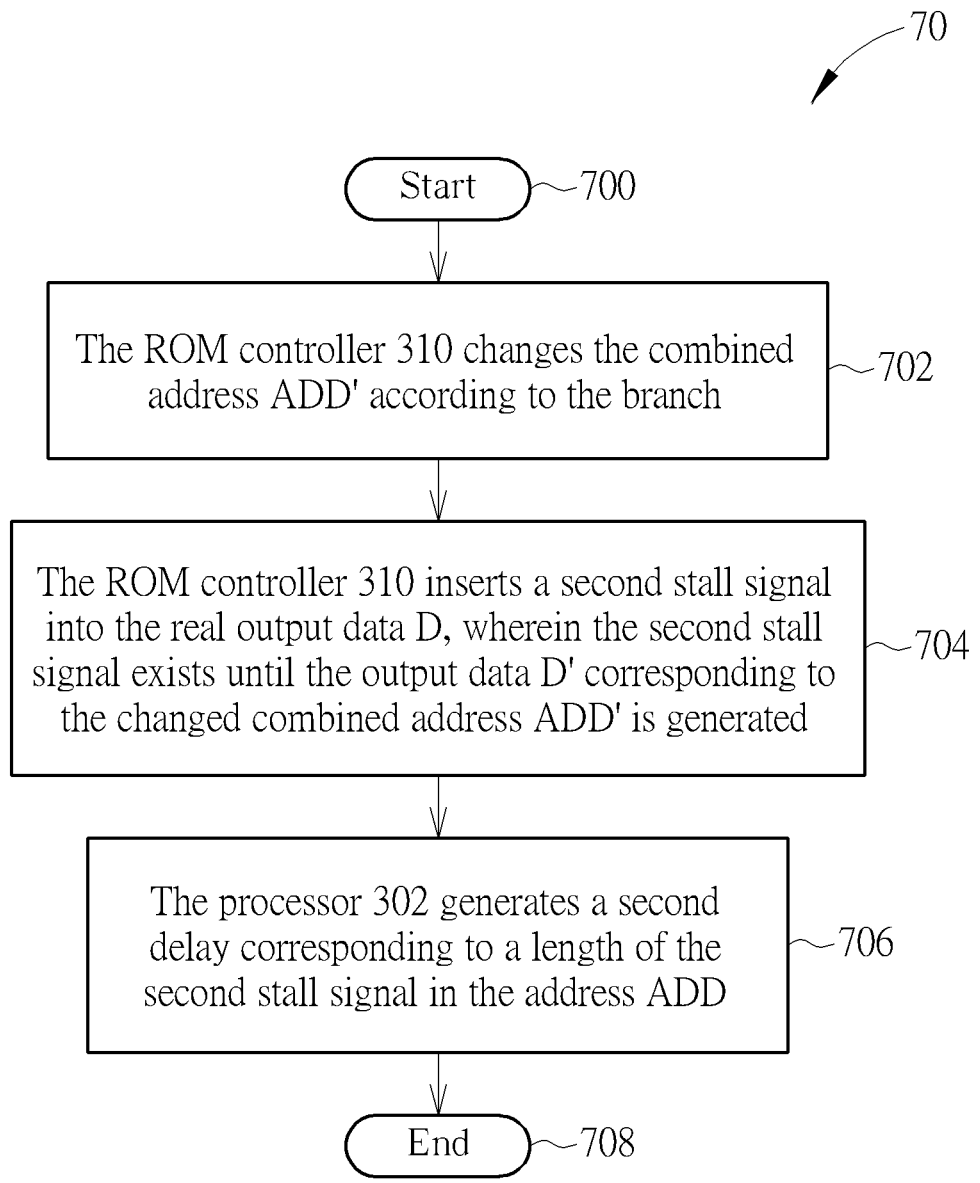
FIG. 7 is a schematic diagram of the branch accessing process according to an embodiment of the present invention.

The above operations of accessing the ROM 304 for the computer system 30 when a branch occurs can be summarized into a branch accessing process 70, as shown in FIG. 7. The branch accessing process 70 includes the following steps:

Step 700: Start.

Step 702: The ROM controller 310 changes the combined address ADD' according to the branch.

Step 704: The ROM controller 310 inserts a second stall signal into the real output data D, wherein the second stall signal exists until the output data D' corresponding to the changed combined address ADD' is generated.

Step 706: The processor 302 generates a second delay corresponding to a length of the second stall signal in the address ADD.

Step 708: End.

Please note that the present invention increases the operation speed of the computer system by combining addresses of the on-chip ROM and extending the output data width of the on-chip ROM. Those skilled in the art can make modifications and alternations accordingly. For example, the frequency divisor for generating the ROM clock, the number of addresses combined in each combined address, and the multiple by which the output data is extended may be any numbers. In addition, other circuit structures may also be utilized for accessing the on-chip ROM, as long as the timing requirements can be met and the operation speed of the computer system can be increased by combining the addresses and extending the output data width of the on-chip ROM.

Figure 8:
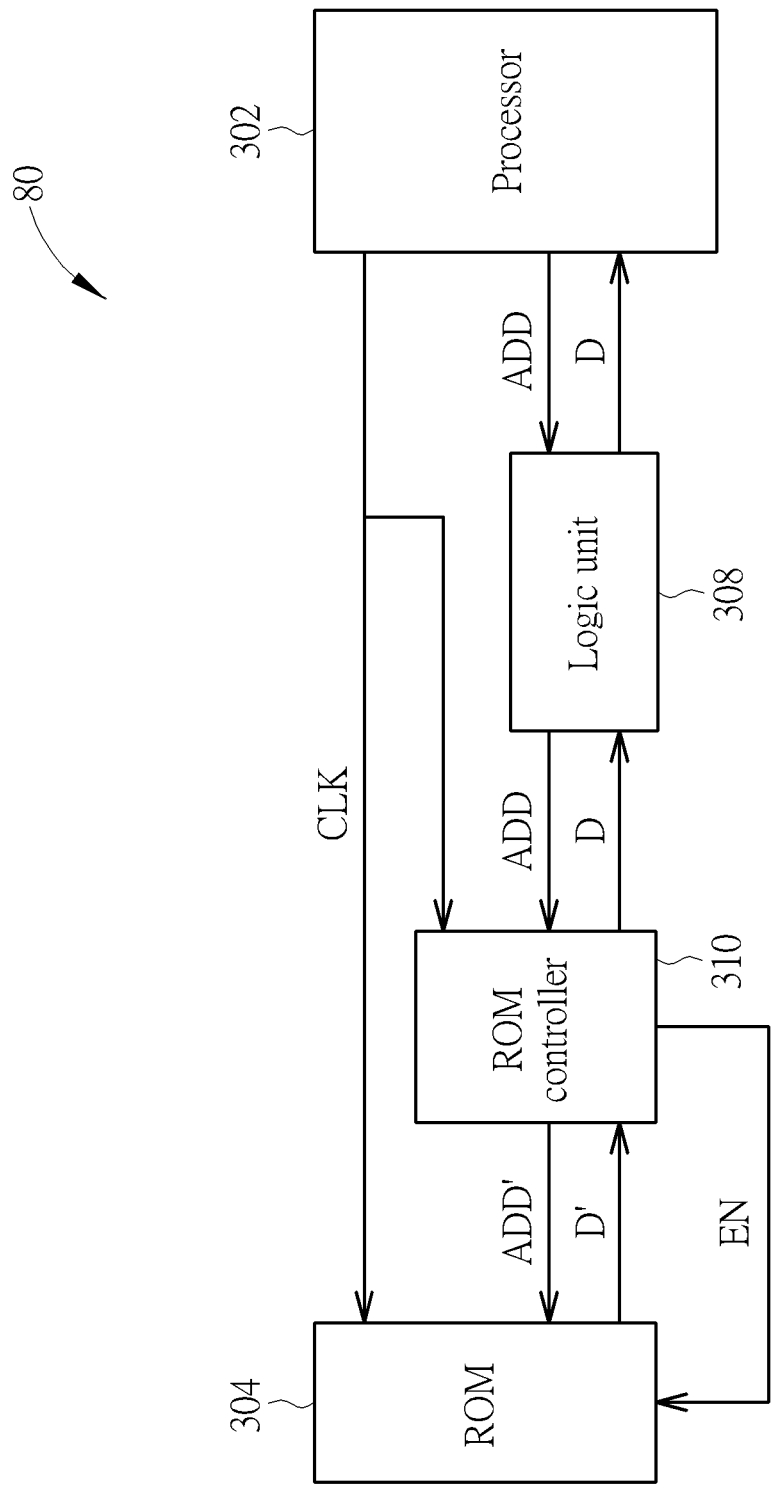
FIG. 8 is a schematic diagram of another computer system according to an embodiment of the present invention.

Please refer to FIG. 8, which is a schematic diagram of another computer system 80 according to an embodiment of the present invention. As shown in FIG. 8, structure of the computer system 80 is similar to that of the computer system 30; hence elements and signals with similar functions are denoted by the same symbols. The main difference between the computer system 80 and the computer system 30 is that in the computer system 80, the processor 302 sends the system clock CLK to the ROM 304 directly without frequency division. In addition, an enable signal EN is introduced to control the ROM 304. When the enable signal EN is off, the ROM 304 may not operate and the output data D' of the ROM 304 is latched. After the enable signal EN is on, the ROM 304 then starts to operate.

Figure 9:
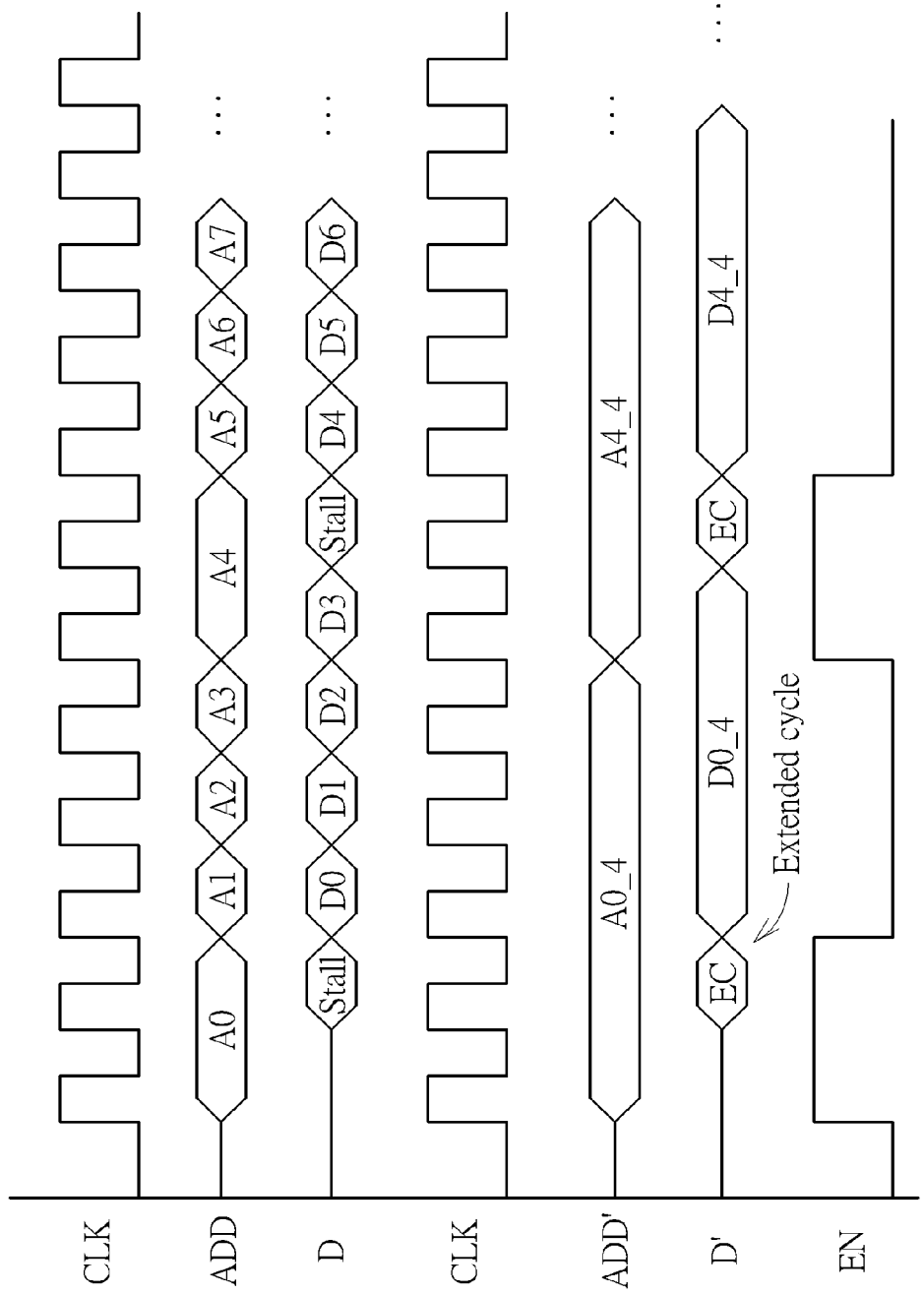
FIG. 9 is a waveform diagram of the signals for accessing the ROM shown in FIG. 8.

One embodiment of the control signals in FIG. 8 is illustrated in FIG. 9, which is a waveform diagram of the signals for accessing the ROM 304 shown in FIG. 8. As shown in FIG. 8 and FIG. 9, the ROM controller 310 combines 4 adjacent addresses ADD into a combined address ADD'. For example, addresses A0, A1, A2 and A3 are combined into a combined address A0_4, addresses A4, A5, A6 and A7 are combined into a combined address A4_4, and so on. The enable signal EN is on when the combined address ADD' changes and is received by the ROM 304, and off after the output data D' of the ROM 304 is generated, in order to save the power consumption of the ROM 304. Since the combined address ADD' received by the ROM 304 provides more information about the ROM data, the ROM 304 can send the output data D' with a larger width, which is fourfold the width of data read from the ROM 104 shown in FIG. 1. In general, the width of the output data D' is extended by a multiple from the original data where the multiple is determined according to the number of the addresses ADD combined into each of the combined address ADD'. The ROM controller 310 fetches the output data D' of the ROM 304 to generate the real output data D. For example, an output data D0_4 is fetched to generate real output data D0, D1, D2 and D3, an output data D4_4 is fetched to generate real output data D4, D5, D6 and D7, and so on. The length of each of the output data D' should be extended to 4 cycles, in order to be fetched successfully. As a result, the real output data D should be equal to the original data read from the ROM 104 shown in FIG. 1. In such a condition, the ROM 304 may not be the critical path in the computer system 80 since the output data D' with an extended width (i.e. fourfold the original output data) is generated at the same time and fetched in each of the system clock cycle CLK.

In order to meet the timing requirement for accessing the on-chip ROM (i.e. the output data is generated in the next clock cycle after the corresponding address is received), however, a delay should be generated in the address ADD, as shown in FIG. 9. Therefore, an extended cycle is inserted into the output data D', and more specifically, inserted before each of the output data such as D0_4, D4_4, etc. A stall signal is inserted into the real output data D, where the length of the stall signal is determined corresponding to the extended cycle, in order to meet the timing requirement for accessing the on-chip ROM. The stall signal may inform the processor 302 to generate the delay and to stop receiving the real output data D, where the delay time corresponds to the length of the stall signal. As a result, the timing requirement for accessing the ROM 304 can be satisfied.

Similarly, in most cases based on the structure shown in FIG. 9, the number of addresses combined in each combined address and the multiple by which the output data is extended are equal. These parameters are determined according to a difference between the access speed for the on-chip ROM and the access speed for the on-chip RAM as well. For example, if data of the on-chip RAM can be accessed in 10 ns, the clock received by the RAM can be improved to 100 MHz; on the other hand, if data of the ROM 304 can be accessed in 40 ns, the clock received by the ROM should be limited to 25 MHz. In this embodiment, therefore, the number of addresses ADD combined in each combined address ADD' and the multiple by which the output data D' is extended are both equal to 4, so that the system clock can reach 100 MHz. The operation speed of the computer system can therefore be increased from 25 MHz to 100 MHz according to the above embodiment. In other cases where the difference between the access speed for the on-chip ROM and the access speed for the on-chip RAM is larger, e.g. the access time for the on-chip ROM is fivefold or tenfold greater than that for the on-chip RAM, these parameters may be larger in order to meet the access time requirements of these memories and the operation speed requirements of the computer system.

Figure 10:
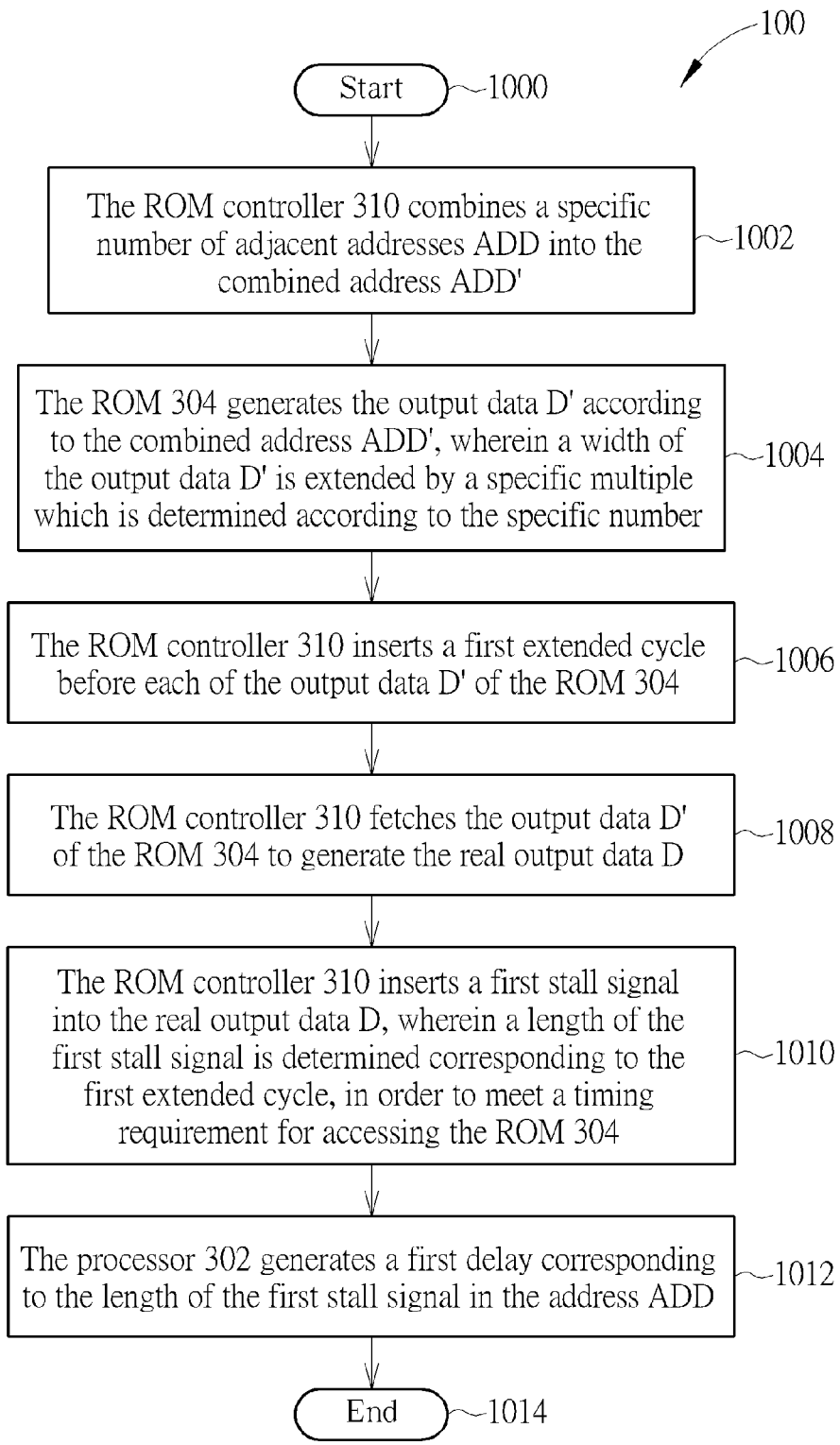
FIG. 10 is a schematic diagram of the on-chip ROM accessing process according to an embodiment of the present invention.

The above operations of accessing the ROM 304 for the computer system 80 can be summarized into an on-chip ROM accessing process 100, as shown in FIG. 10. The on-chip ROM accessing process 100 includes the following steps:

Step 1000: Start.

Step 1002: The ROM controller 310 combines a specific number of adjacent addresses ADD into the combined address ADD'.

Step 1004: The ROM 304 generates the output data D' according to the combined address ADD', wherein a width of the output data D' is extended by a specific multiple which is determined according to the specific number.

Step 1006: The ROM controller 310 inserts a first extended cycle before each of the output data D' of the ROM 304.

Step 1008: The ROM controller 310 fetches the output data D' of the ROM 304 to generate the real output data D.

Step 1010: The ROM controller 310 inserts a first stall signal into the real output data D, wherein a length of the first stall signal is determined corresponding to the first extended cycle, in order to meet a timing requirement for accessing the ROM 304.

Step 1012: The processor 302 generates a first delay corresponding to the length of the first stall signal in the address ADD.

Step 1014: End.

Figure 11:
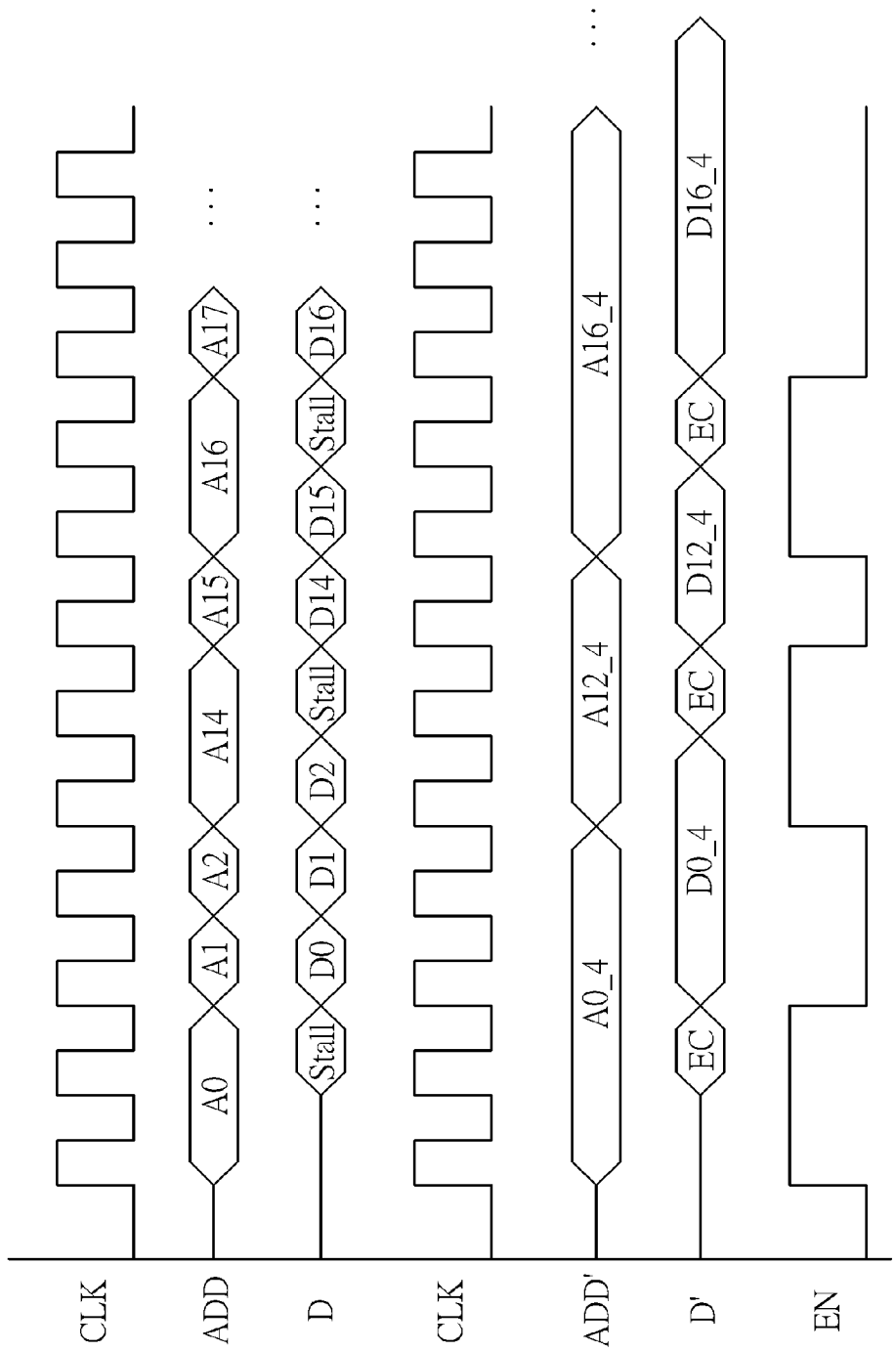
FIG. 11 is a waveform diagram of the signals for accessing the ROM shown in FIG. 8 when a branch occurs.

Similarly, a branch may occur in the address ADD; that is, the processor 302 may not send the address ADD in a predefined order. Please refer to FIG. 11, which is a waveform diagram of the signals for accessing the ROM 304 shown in FIG. 8 when a branch occurs. As shown in FIG. 11, the address sends in the following order: A0, A1, A2, A14, A15, A16 and A17, where the branch occurs between A2 and A14. When the branch is detected, the ROM controller 310 changes the combined address ADD' to be A12_4 instead of A4_4 to follow A0_4 according to the branch, where the combined address A12_4 is combined with the addresses A12, A13, A14 and A15. The output data D' is then interrupted by an extended cycle, i.e. the length of the output data A0_4 may not be extended to 4 cycles. A stall signal is inserted into the real output data D since the data D3 is not required by the processor 302. This stall signal may exist until the output data D' corresponding to the changed combined address ADD' is generated; that is, the ROM controller 310 can fetch the desired real output data (i.e. D14) again. The processor 302 receives the stall signal and generates a delay corresponding to the length of the stall signal in the address ADD. For example, until an output data D12_4 is generated, the stall signal is released and the ROM controller 310 fetches the output data D12_4 to generate real output data D14 and D15. The processor 302 learns that the stall signal is released and proceeds to send the follow-up address ADD. In addition, the length of the extended cycle in the output data should correspond to the length of the stall signal, in order to meet the timing requirement for accessing the on-chip ROM. In most cases, the length of the extended cycle is equal to the length of the stall signal.

Figure 12:
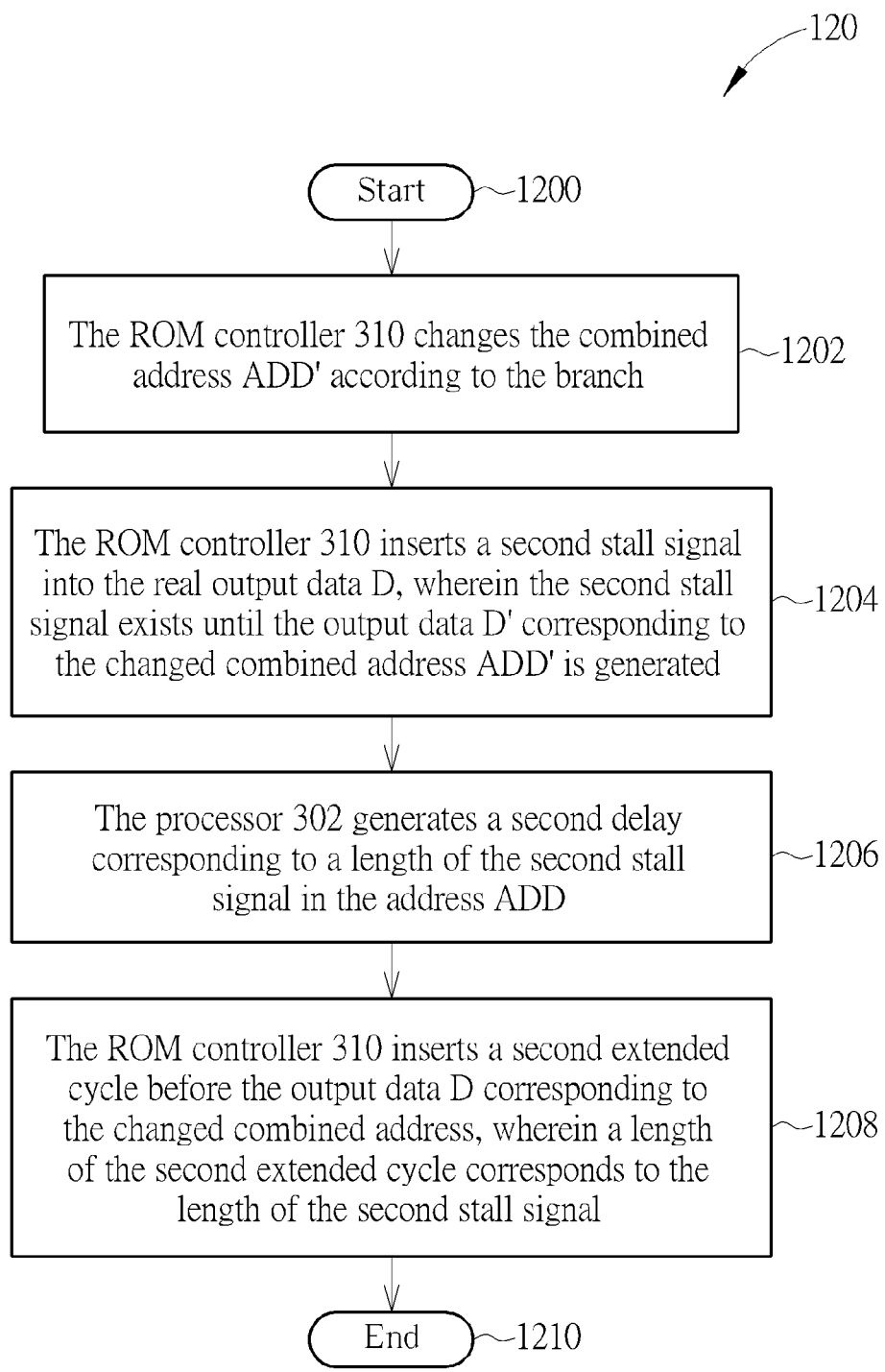
FIG. 12 is a schematic diagram of the branch accessing process according to an embodiment of the present invention.

The above operations of accessing the ROM 304 for the computer system 80 when a branch occurs can be summarized into a branch accessing process 120, as shown in FIG. 12. The branch accessing process 120 includes the following steps:

Step 1200: Start.

Step 1202: The ROM controller 310 changes the combined address ADD' according to the branch.

Step 1204: The ROM controller 310 inserts a second stall signal into the real output data D, wherein the second stall signal exists until the output data D' corresponding to the changed combined address ADD' is generated.

Step 1206: The processor 302 generates a second delay corresponding to a length of the second stall signal in the address ADD.

Step 1208: The ROM controller 310 inserts a second extended cycle before the output data D corresponding to the changed combined address, wherein a length of the second extended cycle corresponds to the length of the second stall signal.

Step 1210: End.

Figure 13:
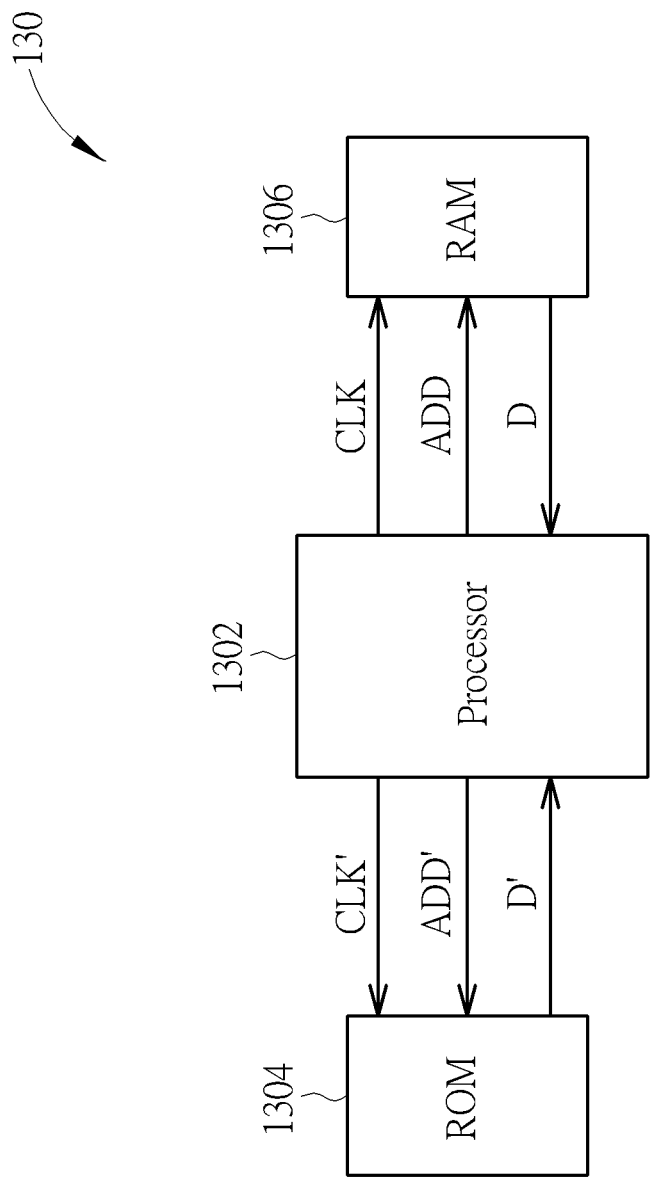
FIG. 13 is a schematic diagram of another computer system according to an embodiment of the present invention.

Please note that, the circuit structure for accessing the on-chip ROM may not be arranged as the functional blocks shown in FIG. 3 and FIG. 8. In some embodiments, the processor may access the on-chip ROM directly without via the logic unit, or the logic unit may be implemented in the on-chip ROM or the processor as a part of the on-chip ROM or the processor. One such embodiment is shown in FIG. 13, which is a schematic diagram of another computer system 130. As shown in FIG. 13, the computer system 130 includes a processor 1302, an on-chip ROM 1304 and an on-chip RAM 1306. The processor 1302 accesses the RAM 1306 with a system clock CLK and an address ADD, and reads an output data D from the RAM 1306. The processor 1302 accesses the ROM 1304 with a ROM clock CLK' and a combined address ADD', where the ROM clock CLK' and the combined address ADD' are converted from the system clock CLK and the address ADD, respectively. The processor 1302 reads an output data D', where the output data D' will be converted into a real output data D. In such a condition, the timing for accessing the ROM 1304 can be improved, which further improves the operation speed of the computer system 130. The converting methods are illustrated in the above paragraphs and will not be narrated herein.

Figure 14:
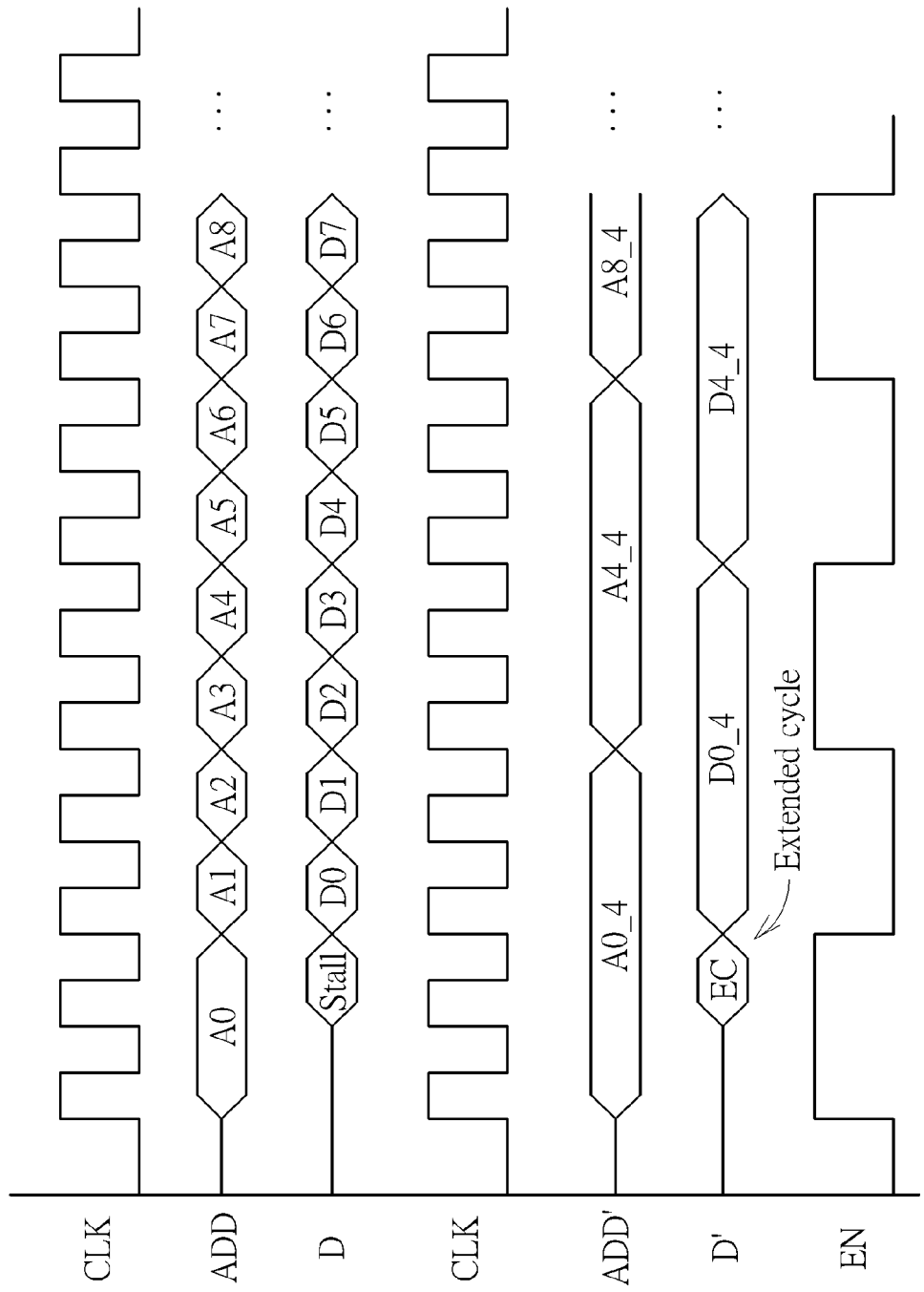
FIG. 14 is a waveform diagram of the signals for accessing the ROM shown in FIG. 8 according to an embodiment of the present invention.

In some embodiments, the above methods of ROM access for the computer systems 30 and 80 may also be combined. For example, the method of predicting the address may also be utilized in the computer system 80. One such embodiment is illustrated as a waveform diagram shown in FIG. 14. Please refer to both FIG. 9 and FIG. 14. As shown in FIG. 9, an extended cycle is inserted into the output data D' when a new combined address ADD' is generated, and a corresponding stall signal is inserted into the real output data D. In comparison, if the ROM controller 310 can predict the follow-up address ADD, e.g. predict the address A4 will arrive after the address A3, and predict the address A8 will arrive after the address A7, the extended cycle will not be required before the output data D4_4, D8_4, etc. Only one extended cycle before the output data D0_4 is required. As a result, the stall signal before the real output data D4, D8, etc. will also be omitted; hence there will be no delay in the address A4, A8, etc., as shown in FIG. 14.

As mentioned above, the memories in the computer system can be classified into two types: external and on-chip. The access speeds are far different between these two types of memories. The on-chip memories are usually accessed within one system clock cycle and the external memories are usually accessed in hundreds of system clock cycles. The embodiments of the present invention provide methods for accessing on-chip memories for a computer system, especially for a computer system with both on-chip RAM and on-chip ROM, in order to overcome the drawback that the on-chip ROM has a lower access speed than the on-chip RAM. These embodiments are only related to the on-chip memories, and have nothing to do with the external memory. These on-chip memories are implemented on an internal bus and data of these on-chip memories should be read in one clock cycle.

In the prior art, the on-chip ROM has a lower access speed than the on-chip RAM and a larger access time delay may be generated in the access path for the on-chip ROM, such that this access path may become a critical path in some systems or for some application. As a result, the clock frequency and operation speed of the computer system will be limited due to the access of the on-chip ROM. In comparison, the present invention provides a method of accessing an on-chip ROM and a computer system thereof, which is capable of increasing the operation speed of the computer system. A ROM controller is introduced to the computer system, for combining original addresses of the on-chip ROM into a combined address, so that a width of the output data of the ROM 304 is extended accordingly. Therefore, the operation speed of the computer system can be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of accessing an on-chip read only memory (ROM), the method comprising:
   dividing a frequency of a system clock by a specific divisor, in order to generate a ROM clock;
   combining a specific number of adjacent addresses into a combined address, wherein the specific number is determined according to the specific divisor;
   inserting a first stall signal into a real output data, wherein a length of the first stall signal is determined in order to meet a timing requirement for accessing the on-chip ROM;
   generating an output data of the on-chip ROM according to the combined address, wherein a width of the output data is extended by a specific multiple which is determined according to the specific number; and
   generating a first delay corresponding to the length of the first stall signal in the address.

2. The method of claim 1, wherein the specific divisor, the specific number and the specific multiple are equal.

3. The method of claim 1, further comprising fetching the output data of the on-chip ROM to generate the real output data.

4. The method of claim 1, wherein the specific divisor, the specific number and the specific multiple are determined according to a difference between an access speed for the on-chip ROM and an access speed for a random access memory (RAM).

5. The method of claim 1, wherein when a branch occurs in the address, the method further comprising:
   changing the combined address according to the branch;
   inserting a second stall signal into the real output data, wherein the second stall signal exists until the output data corresponding to the changed combined address is generated; and
   generating a second delay corresponding to a length of the second stall signal in the address.

6. A computer system for accessing an on-chip read only memory (ROM), the computer system comprising:

a processor;
a logic circuit, controlled by the processor, for generating control signals for the on-chip ROM and receiving a real output data from the on-chip ROM; and
a ROM controller, for converting the control signals to control the on-chip ROM by executing the following steps:
dividing a frequency of a system clock by a specific divisor, in order to generate a ROM clock;
combining a specific number of adjacent addresses into a combined address, wherein the specific number is determined according to the specific divisor; and
inserting a first stall signal into the real output data, wherein a length of the stall signal is determined in order to meet a timing requirement for accessing the on-chip ROM;
wherein the on-chip ROM generates an output data according to the combined address, wherein a width of the output data is extended by a specific multiple which is determined according to the specific number; and
wherein the processor generates a first delay corresponding to the length of the first stall signal in the address.

7. The computer system of claim 6, wherein the specific divisor, the specific number and the specific multiple are equal.

8. The computer system of claim 6, wherein the ROM controller further controls the on-chip ROM by executing the following steps:
fetching the output data of the on-chip ROM to generate the real output data.

9. The computer system of claim 6, wherein the specific divisor, the specific number and the specific multiple are determined according to a difference between an access speed for the on-chip ROM and an access speed for a random access memory (RAM).

10. The computer system of claim 6, wherein when a branch occurs in the address, the ROM controller further controls the on-chip ROM by executing the following steps:
changing the combined address according to the branch; and
inserting a second stall signal into the real output data, wherein the second stall signal exists until the output data corresponding to the changed combined address is generated;
wherein the processor generates a second delay corresponding to a length of the second stall signal in the address.

11. A method of accessing an on-chip read only memory (ROM), the method comprising:
combining a specific number of adjacent addresses into a combined address;
generating an output data of the on-chip ROM according to the combined address, wherein a width of the output data is extended by a specific multiple which is determined according to the specific number;
inserting a first extended cycle before each of the output data of the on-chip ROM;
inserting a first stall signal into a real output data, wherein a length of the first stall signal is determined corresponding to the first extended cycle, in order to meet a timing requirement for accessing the on-chip ROM; and
generating a first delay corresponding to the length of the first stall signal in the address.

12. The method of claim 11, wherein the specific number and the specific multiple are equal.

13. The method of claim 11, further comprising fetching the output data of the on-chip ROM to generate the real output data.

14. The method of claim 11, wherein the specific number and the specific multiple are determined according to a difference between an access speed for the on-chip ROM and an access speed for a random access memory (RAM).

15. The method of claim 11, wherein when a branch occurs in the address, the method further comprising:
changing the combined address according to the branch;
inserting a second stall signal into the real output data, wherein the second stall signal exists until the output data corresponding to the changed combined address is generated;
generating a second delay corresponding to a length of the second stall signal in the address; and
inserting a second extended cycle before the output data corresponding to the changed combined address, wherein a length of the second extended cycle corresponds to the length of the second stall signal.

16. The method of claim 11, wherein the on-chip ROM is controlled by an enable signal, which is on when the combined address changes and off after the output data of the on-chip ROM is generated.

17. A computer system for accessing an on-chip read only memory (ROM), the computer system comprising:
a processor;
a logic circuit, controlled by the processor, for generating control signals for the on-chip ROM and receiving a real output data from the on-chip ROM; and
a ROM controller, for converting the control signals to control the on-chip ROM by executing the following steps:
combining a specific number of adjacent addresses into a combined address; and
inserting a first stall signal into the real output data, wherein a length of the stall signal is determined corresponding to a first extended cycle, in order to meet a timing requirement for accessing the on-chip ROM;
wherein the on-chip ROM generates an output data according to the combined address wherein a width of the output data is extended by a specific multiple which is determined according to the specific number, and inserts the first extended cycle before each of the output data of the on-chip ROM; and
wherein the processor generates a first delay corresponding to the length of the first stall in the address.

18. The computer system of claim 17, wherein the specific number and the specific multiple are equal.

19. The computer system of claim 17, wherein the ROM controller further controls the on-chip ROM by executing the following steps:
fetching the output data of the on-chip ROM to generate the real output data.

20. The computer system of claim 17, wherein the specific number and the specific multiple are determined according to a difference between an access speed for the on-chip ROM and an access speed for a random access memory (RAM).

21. The computer system of claim 17, wherein when a branch occurs in the address, the ROM controller further controls the on-chip ROM by executing the following steps:
changing the combined address according to the branch; and inserting a second stall signal into the real output data, wherein the second stall signal exists until the output data corresponding to the changed combined address is generated;

wherein the processor generates a second delay corresponding to a length of the second stall signal in the address; and wherein the on-chip ROM inserts a second extended cycle before the output data corresponding to the changed combined address, wherein a length of the second extended cycle corresponds to the length of the second stall signal.

22. The computer system of claim 17, wherein the on-chip ROM is controlled by an enable signal, which is on when the combined address changes and off after the output data of the on-chip ROM is generated.

* * * * *